Patented Aug. 3, 1937

2,088,911

UNITED STATES PATENT OFFICE 2,088,911

AZO DYESTUFFS AND A PROCESS OF MAKING THEM

Hans Krzikalla and Bernhard Ritzenthaler, Ludwigshafen-on-the-Rhine, Germany, assignors to General Aniline Works, Inc., New York, N. Y., a corporation of Delaware No Drawing. Application June 24, 1936, Serial No. 87,042. In Germany July 2, 1935

7 Claims. (Cl. 260—97)

The present invention relates to azo dyestuffs and a process of making them.

We have found that very valuable azo dyestuffs are obtained by coupling 5,6-dihydro-1,3-dihydroxybenzene which is tautomeric with cyclohexane-1,3-dion or its nuclear substituted derivatives with diazotized aromatic amines which contain in ortho-position to an amino group a carboxylic, carboxylic ester, hydroxy, alkoxy or O-acyl group and if desired treating the resulting dyestuffs with agents supplying metals.

Dihydro-1,3-dihydroxybenzene and its alkyl, aralkyl or cycloalkyl derivatives are obtainable for example by catalytic hydrogenation of the corresponding 1.3-dihydroxybenzenes in the presence of at least 1 molecular equivalent of strongly basic substances or by the method of Vorländer and Erig "Liebig's Annalen der Chemie", vol. 294, page 314.

The treatment of the dyestuffs with agents supplying metals may be effected in substance by the usual methods by boiling under reflux or heating the dyestuff under pressure with the compound supplying the metal in an aqueous, acid or alkaline medium, or also in the presence of organic solvents, such as alcohol or pyridine, or also if desired by aftertreatment of the dyestuffs with agents supplying metals on the fibre.

The resulting dyestuffs, in so far as they are capable of dyeing wool, are distinguished by good levelling power and very good fastness. A special advantage of the dyestuffs resides in the fact that with the aid of 5,6-dihydro-1,3-dihydroxybenzene and its said derivatives as coupling components especially beautiful and fast brown shades can be obtained.

The following examples will further illustrate how the present invention is carried out in practice but the invention is not restricted to these examples. The parts are by weight.

Example 1

19.9 parts of 2-amino-4,6-dinitro-1-hydroxybenzene are dissolved in aqueous caustic soda solution and diazotized in the usual manner with 69 parts of sodium nitrite and hydrochloric acid. The resulting diazo compound is then coupled with about 12 parts of 5,6-dihydro-1,3-dihydroxybenzene in a solution rendered slightly alkaline with sodium carbonate. When the coupling is completed, the dyestuff is salted out and filtered off by suction. When the dyestuff is used for dyeing wool and the dyeing is after-chromed, a level, beautiful brown dyeing is obtained which is fast to washing, fulling and light. The dyestuff may also be dyed on wool with ammonium chromate by the single-bath process.

A similar dyeing is obtained by employing 4-methyl-5,6-dihydro-1,3-dihydroxybenzene as the coupling component instead of 5,6-dihydro-1,3-dihydroxybenzene or by employing 4-nitro-2-aminophenol as the diazo component.

Example 2

23.4 parts of 1-hydroxy-2-amino-6-nitrobenzene-4-sulphonic acid are diazotized and coupled with about 12 parts of 5,6-dihydro-1,3-dihydroxybenzene in a solution rendered alkaline with sodium carbonate. After stirring for several hours, the dyestuff is salted out and filtered off by suction. The dyestuff obtained dyes wool blue-red shades which are converted by afterchroming into a beautiful, fast reddish brown.

If 1-hydroxy-2-amino-4-nitrobenzene-6-sulphonic acid be employed as the diazo component, a dyestuff is obtained which dyes wool brown shades which are converted by after-chroming into a beautiful yellow-brown, while the dyestuffs prepared from diazotized 1-hydroxy-2-aminobenzene-4-sulphonic acid or 1-hydroxy-2-amino-4-chlorbenzene-6-sulphonic acid and 5,6-dihydro-1,3-dihydroxybenzene yield yellow shades on wool which are converted by after-chroming into a still more reddish brown.

Example 3

28.6 parts of the diazo compound derived from 1 - amino-2-hydroxy-6-nitrobenzene-4-sulphonic acid are coupled with a solution, rendered alkaline with sodium carbonate, of 12 parts of 5,6-dihydro-1,3-dihydroxybenzene and the whole stirred until the diazo compound has disappeared. The dyestuff is then salted out, filtered off by suction and converted into the complex chromium compound by boiling under reflux with an aqueous solution of chromium formate. A dyestuff is obtained which dyes wool and leather fast redbrown shades.

The complex chromium compound prepared in an analogous manner from the azo dyestuff prepared from diazotized 1-amino-2-naphthol-4-sulphonic acid and 5,6-dihydro-1,3-dihydroxybenzene dyes wool and leather violet shades.

Example 4

21.7 parts of 2-amino-5-sulphobenzoic acid are diazotized in the usual manner and coupled with 12 parts of 5,6-dihydro-1,3-dihydroxybenzene in a solution rendered alkaline with sodium carbonate. A very well levelling dyestuff is obtained which dyes wool greenish yellow shades. The after-chromed dyeing is reddish yellow and of excellent fastness to washing and fulling. The dyestuff prepared from diazotized 1-amino-2-benzene carboxylic acid and 5,6-dihydro-1,3-dihydroxybenzene behaves similarly in the direct and after-chromed wool dyeings. The azo dyestuff derived from diazotized 4-nitro-1-amino-2-benzene-carboxylic acid and 5,6-dihydro-1,3-dihydroxybenzene dyes wool yellow shades which become yellow-brown by after-chroming on the fibre.

*Example 5*

24.8 parts of 5-nitro-1-methoxy-2-aminobenzene-4-sulphonic acid are diazotized in the usual manner and coupled with 12 parts of 5,6-dihydro-1,3-dihydroxybenzene in the presence of sodium acetate. The dyestuff is salted out. It dyes leather beautiful yellow-brown shades. The dyestuff may be converted into the corresponding complex metal compounds by treatment with metal salts, as for example with copper or chromium salts.

What we claim is:—

1. A process for the production of azo dyestuffs capable of being converted into complex metal compounds which consists in coupling 5,6-dihydro-1,3-dihydroxybenzenes with diazotized aromatic amines which contain in ortho-position to an amino group a substituent selected from the group consisting of hydroxy, alkoxy, O-acyl, carboxylic acid and carboxylic acid ester groups.

2. Azo dyestuffs capable of being converted into complex metal compounds corresponding to the general formula

wherein A stands for an aryl radicle substituted in the ortho-position to the azo group by a member of the group consisting of hydroxy, alkoxy, O-acyl, carboxylic acid and carboxylic acid ester groups and B stands for the radicle of a 5,6-dihydro-1,3-dihydroxybenzene.

3. Azo dyestuffs capable of being converted into complex metal compounds corresponding to the general formula

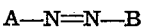

wherein A stands for an aryl radicle substituted in the ortho-position to the azo group by a member of the group consisting of hydroxy, alkoxy, O-acyl, carboxylic acid and carboxylic acid ester groups and wherein B stands for the radicle of 5,6-dihydro-1,3-dihydroxybenzene.

4. Azo dyestuffs capable of being converted into complex metal compounds corresponding to the general formula

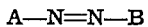

wherein A stands for a radicle of the benzene series substituted in the ortho position by a member of the group consisting of hydroxy, alkoxy, O-acyl, carboxylic acid and carboxylic acid ester groups and wherein B stands for the radicle of 5,6-dihydro-1,3-dihydroxybenzene.

5. The azo dyestuff capable of being converted into complex metal compounds corresponding to the formula

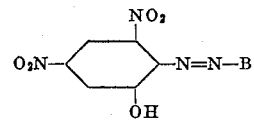

wherein B stands for the radicle of 5,6-dihydro-1,3-dihydroxybenzene.

6. The azo dyestuff capable of being converted into complex metal compounds corresponding to the formula

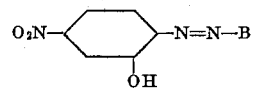

wherein B stands for the radicle of 5,6-dihydro-1,3-dihydroxybenzene.

7. The azo dyestuff capable of being converted into complex metal compounds corresponding to the formula

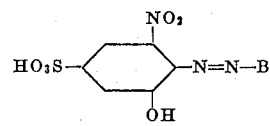

wherein B stands for the radicle of 5,6-dihydro-1,3-dihydroxybenzene.

HANS KRZIKALLA.
BERNHARD RITZENTHALER.